United States Patent
Goetz et al.

(10) Patent No.: US 10,073,684 B2
(45) Date of Patent: *Sep. 11, 2018

(54) ADAPTIVE SELECTION OF PROGRAMMING LANGUAGE VERSIONS FOR COMPILATION OF SOFTWARE PROGRAMS

(71) Applicant: Oracle International Corporation, Redwood Shores, CA (US)

(72) Inventors: Brian Goetz, Williston, VT (US); Alexander R. Buckley, Cupertino, CA (US)

(73) Assignee: Oracle International Corporation, Redwood Shores, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/223,759

(22) Filed: Jul. 29, 2016

(65) Prior Publication Data

US 2016/0342397 A1 Nov. 24, 2016

Related U.S. Application Data

(63) Continuation of application No. 13/341,105, filed on Dec. 30, 2011, now Pat. No. 9,489,184.

(51) Int. Cl.
*G06F 9/44* (2018.01)
*G06F 9/46* (2006.01)
(Continued)

(52) U.S. Cl.
CPC .............. *G06F 8/41* (2013.01); *G06F 8/34* (2013.01); *G06F 8/36* (2013.01); *G06F 8/443* (2013.01);
(Continued)

(58) Field of Classification Search
CPC .. G06F 17/3089; G06F 17/2288; G06F 17/28; G06F 11/3688; G06F 11/3696;
(Continued)

(56) References Cited

U.S. PATENT DOCUMENTS 4,558,413 A   12/1985  Schmidt
5,179,703 A *  1/1993  Evans ................. G06F 9/45512
                                                         703/22

(Continued)

OTHER PUBLICATIONS

Sophia Drossopoulou et al., A Fragment Calculus—towards a model of Separate Compilation, Linking and Binary Compatibility, 1999, [Retrieved on Feb. 14, 2018]. Retrieved from the internet: <URL: http://ieeexplore.ieee.org/stamp/stamp.jsp?tp=&arnumber=782606> 10 Pages (1-10) (Year: 1999).*

(Continued)

*Primary Examiner* — Anibal Rivera
(74) *Attorney, Agent, or Firm* — Park, Vaughan, Fleming & Dowler LLP

(57) ABSTRACT

The disclosed embodiments provide a system that facilitates the development and compilation of a software program. During operation, the system obtains a set of compilation units to be used in the software program and a version order associated with a programming language of the compilation units. Next, for each compilation unit from the set of compilation units, the system uses the version order to select a version of the programming language that is compatible with the compilation unit. The system then uses the version to compile the compilation unit.

16 Claims, 4 Drawing Sheets

(51) Int. Cl.
*G06F 9/445* (2018.01)
*G06F 11/07* (2006.01)
*G06F 17/50* (2006.01)
*G06F 17/30* (2006.01)
*G06F 8/41* (2018.01)
*G06F 8/36* (2018.01)
*G06F 8/71* (2018.01)
*G06F 8/61* (2018.01)
*G06F 8/34* (2018.01)
*G06F 9/448* (2018.01)

(52) U.S. Cl.
CPC ............... *G06F 8/456* (2013.01); *G06F 8/47* (2013.01); *G06F 8/61* (2013.01); *G06F 8/71* (2013.01); *G06F 9/466* (2013.01); *G06F 9/449* (2018.02); *G06F 9/44536* (2013.01); *G06F 17/3089* (2013.01)

(58) Field of Classification Search
CPC .. G06F 11/3644; G06F 9/466; G06F 9/30047; G06F 9/44521; G06F 9/455; G06F 9/542; G06F 9/443; G06F 9/445; G06F 9/44536; G06F 9/45512; G06F 9/44; G06F 9/5038; G06F 9/5055; G06F 8/61; G06F 8/71; G06F 8/443; G06F 8/43; G06F 8/65; G06F 8/34; G06F 8/51; G06F 8/436; G06F 8/67; G06F 8/41; G06F 9/4436; G06F 9/45516; G06F 17/5045
See application file for complete search history.

(56) References Cited

U.S. PATENT DOCUMENTS

| | | | |
|---|---|---|---|
| 5,613,101 A | 3/1997 | Lillich | |
| 5,634,114 A | 5/1997 | Shipley | |
| 5,774,729 A * | 6/1998 | Carney | G06F 9/542 717/126 |
| 5,956,513 A * | 9/1999 | McLain, Jr. | G06F 8/71 717/142 |
| 6,237,136 B1 | 5/2001 | Sadahiro | |
| 6,457,170 B1 * | 9/2002 | Boehm | G06F 8/71 717/106 |
| 6,487,713 B1 * | 11/2002 | Cohen | G06F 8/34 717/105 |
| 6,501,486 B1 | 12/2002 | Lau | |
| 6,519,767 B1 * | 2/2003 | Carter | G06F 8/71 712/E9.084 |
| 6,698,014 B1 | 2/2004 | Rechter | |
| 6,981,250 B1 * | 12/2005 | Wiltamuth | G06F 8/71 707/999.202 |
| 7,032,229 B1 | 4/2006 | Flores | |
| 7,143,395 B2 | 11/2006 | Applin | |
| 7,155,712 B2 * | 12/2006 | Takimoto | G06F 9/44521 717/170 |
| 7,317,394 B2 | 1/2008 | Koh | |
| 7,512,903 B2 * | 3/2009 | Hudson, Jr. | G06F 3/0481 715/709 |
| 7,707,359 B2 * | 4/2010 | Mesard | G06F 9/30047 711/137 |
| 7,908,593 B2 * | 3/2011 | Arnold | G06F 11/3688 717/131 |
| 8,028,133 B2 * | 9/2011 | Dice | G06F 9/466 711/152 |
| 8,136,101 B2 | 3/2012 | Prakash | |
| 8,230,411 B1 * | 7/2012 | Vorbach | G06F 8/433 717/154 |
| 8,402,438 B1 | 3/2013 | Andrews | |
| 8,677,329 B2 * | 3/2014 | Beretta | G06F 9/5055 714/E11.209 |
| 9,052,966 B1 * | 6/2015 | Quinlan | G06F 8/51 |
| 9,166,629 B1 | 10/2015 | Bentley | |
| 9,524,192 B2 * | 12/2016 | van Velzen | G06F 9/5038 |
| 2002/0059561 A1 | 5/2002 | Foster | |
| 2002/0124238 A1 * | 9/2002 | Metzgen | G06F 17/5045 717/136 |
| 2002/0156932 A1 | 10/2002 | Schneiderman | |
| 2003/0093551 A1 | 5/2003 | Taylor | |
| 2003/0126559 A1 * | 7/2003 | Fuhrmann | G06F 9/4448 715/229 |
| 2004/0015413 A1 | 1/2004 | Abu-Hejleh | |
| 2004/0143823 A1 | 7/2004 | Wei | |
| 2004/0168160 A1 | 8/2004 | Latloukal | |
| 2004/0172462 A1 | 9/2004 | Iterum | |
| 2005/0081184 A1 * | 4/2005 | Deedwaniya | G06F 9/44521 717/100 |
| 2005/0091583 A1 | 4/2005 | Goldberg | |
| 2006/0020919 A1 * | 1/2006 | King | G06F 11/3696 717/124 |
| 2006/0101438 A1 * | 5/2006 | Mariani | G06F 9/45516 717/148 |
| 2006/0225053 A1 | 10/2006 | Lanksham | |
| 2007/0094609 A1 | 4/2007 | Gilboa | |
| 2007/0150876 A1 | 6/2007 | Laksminarasimhan | |
| 2007/0168969 A1 | 7/2007 | Prakash | |
| 2007/0169004 A1 | 7/2007 | Prakash | |
| 2007/0180439 A1 * | 8/2007 | Sundararajan | G06F 11/3644 717/158 |
| 2007/0220496 A1 | 9/2007 | Kasama | |
| 2007/0234316 A1 * | 10/2007 | Bayerlein | G06F 8/71 717/140 |
| 2007/0245323 A1 * | 10/2007 | Bertelrud | G06F 8/41 717/140 |
| 2008/0028373 A1 * | 1/2008 | Yang | G06F 8/443 717/140 |
| 2008/0052695 A1 * | 2/2008 | Dickenson | G06F 8/436 717/151 |
| 2008/0052706 A1 | 2/2008 | Isaacson | |
| 2008/0086505 A1 | 4/2008 | McKellar | |
| 2008/0222621 A1 | 9/2008 | Knight | |
| 2008/0228373 A1 | 9/2008 | Akimoto | |
| 2008/0229290 A1 | 9/2008 | Jones | |
| 2008/0320460 A1 * | 12/2008 | Miller | G06F 8/71 717/162 |
| 2009/0049288 A1 | 2/2009 | Weissman | |
| 2009/0055809 A1 | 2/2009 | Campbell | |
| 2009/0064117 A1 | 3/2009 | Bashkansky | |
| 2009/0113402 A1 | 4/2009 | Chen | |
| 2009/0150872 A1 | 6/2009 | Russell | |
| 2009/0193444 A1 | 7/2009 | Clark | |
| 2009/0249328 A1 * | 10/2009 | Wetherell | G06F 8/71 717/175 |
| 2009/0265697 A1 * | 10/2009 | Bhat | G06F 8/71 717/163 |
| 2009/0282401 A1 * | 11/2009 | Todorova | G06F 8/61 717/175 |
| 2010/0037035 A1 * | 2/2010 | Archer | G06F 8/443 712/28 |
| 2010/0042986 A1 * | 2/2010 | Greiner | G06F 8/61 717/174 |
| 2010/0192135 A1 | 7/2010 | Krishnaswamy | |
| 2010/0251212 A1 * | 9/2010 | Grunkemeyer | G06F 8/71 717/122 |
| 2010/0257515 A1 * | 10/2010 | Bates | G06F 8/67 717/145 |
| 2011/0161325 A1 * | 6/2011 | Jones | G06F 17/3089 707/741 |
| 2011/0202905 A1 * | 8/2011 | Mahajan | G06F 8/43 717/140 |
| 2011/0214016 A1 * | 9/2011 | Gschwind | G06F 8/443 714/16 |
| 2011/0219356 A1 * | 9/2011 | Ramidi | G06F 9/44 717/110 |
| 2011/0307897 A1 * | 12/2011 | Atterbury | G06F 9/4436 718/102 |
| 2012/0079466 A1 | 3/2012 | Gonion | |
| 2012/0079469 A1 | 3/2012 | Gonion | |
| 2012/0095950 A1 * | 4/2012 | Ziegler | G06Q 10/06 706/47 |

(56) References Cited

U.S. PATENT DOCUMENTS

| | | |
|---|---|---|
| 2012/0096433 A1 | 4/2012 | Reinhold |
| 2012/0227061 A1 | 9/2012 | Hunt |
| 2014/0249797 A1* | 9/2014 | Liu .................... G06F 17/2288 |
| | | 704/2 |

OTHER PUBLICATIONS

Michael J. Voss et al., High-Level Adaptive Program Optimization with ADAPT, ACM 1-58113-346-4/01/0006, Jun. 18-20, 2001, [Retrieved on Feb. 14, 2018]. Retrieved from the internet: <URL: http://delivery.acm.org/10.1145/380000/379583/p93-voss.pdf?> 10 Pages (93-102) (Year: 2001).*

Reinhold Plosch: "Evaluation of Assertion Support for the Java Programming Language", in Journal of Object Technology, vol. 1, No. 3, Special Issue: TOOLS USA 2002 proceedings, pp. 5-17. http://joy.fm/issues/issue_2002_08/article1.

Bryn Llewellyn, "PL/SQL conditional compilation", Nov. 10, 2005. 96 pages http://www.oracle.com/technology/tech/pl_sql/pdf/Plsql_Conditional_Compilation.pdf.

Digibarn, "Mother Tongues Tracing the roots of computer languages through the ages", Mar. 2003. 1 page https://web.archive.org/web/20030801025428/http://www.digibarn.com/collections/posters/tongues/.

* cited by examiner

ADAPTIVE SELECTION OF PROGRAMMING LANGUAGE VERSIONS FOR COMPILATION OF SOFTWARE PROGRAMS

RELATED CASE

This application is a continuation of, and hereby claims priority under 35 U.S.C. § 120 to, U.S. patent application Ser. No. 13/341,105, issued at U.S. Pat. No. 9,489,184 on 8 Nov. 2016, entitled "Adaptive Selection of Programming Language Versions for Compilation of Software Programs," by inventors Brian Goetz and Alexander R. Buckley, which was filed on 30 Dec. 2011, and which is hereby incorporated by reference.

BACKGROUND

Field

The present embodiments relate to versioning of programming languages. More specifically, the present embodiments relate to techniques for adaptive selection of programming language versions for compilation of software programs.

Related Art

As programming languages evolve, features of the programming languages may be added, removed, and/or modified. Furthermore, differences between an older version and a newer version of a programming language may cause software programs written under the older version to no longer be valid under the newer version. For example, the addition of a "foreach" keyword to a programming language may adversely affect the compilation of software programs that use "foreach" as an identifier.

To enable the use of features from a newer version of a programming language, incompatibilities with the newer version must be removed from a software program developed under an older version of the programming language. However, the removal of such incompatibilities may be time-consuming and/or tedious, resulting in significant overhead and/or delay before features of the newer version may be used in the software program. For example, the migration of a large code base with thousands of source files to a new version of a programming language may require months of manual editing of the source files before features of the new version may be used in the code base.

Hence, what is needed is a mechanism for facilitating the migration of code bases from older versions of programming languages to newer versions of the programming languages.

SUMMARY

The disclosed embodiments provide a system that facilitates the development and compilation of a software program. During operation, the system obtains a set of compilation units to be used in the software program and a version order associated with a programming language of the compilation units. Next, for each compilation unit from the set of compilation units, the system uses the version order to select a version of the programming language that is compatible with the compilation unit. The system then uses the selected version to compile the compilation unit.

In some embodiments, the system also obtains a version range associated with the programming language, and further uses the version range to select the version that is compatible with the compilation unit.

In some embodiments, the version range includes a minimum version number and a maximum version number.

In some embodiments, the version order is at least one of an ascending order, a descending order, and a user-specified order.

In some embodiments, using the version order to select the version that is compatible with the compilation unit involves:
  (i) attempting to compile the compilation unit using a first version number in the version order;
  (ii) if the compilation units compiles successfully with the first version number, selecting the first version number; and
  (iii) if the compilation unit does not compile successfully with the first version number, attempting to compile the compilation unit using a second version number following the first version number in the version order.

In some embodiments, the second version number is selected if the compilation unit compiles successfully with the second version number.

In some embodiments, the second version number is further selected if other compilation units in the set of compilation units also compile successfully with the second version number.

In some embodiments, the set of compilation units corresponds to at least one of a package, a module, and a code base for the software program.

BRIEF DESCRIPTION OF THE FIGURES

In the figures, like reference numerals refer to the same figure elements.

DETAILED DESCRIPTION

Figure 1:
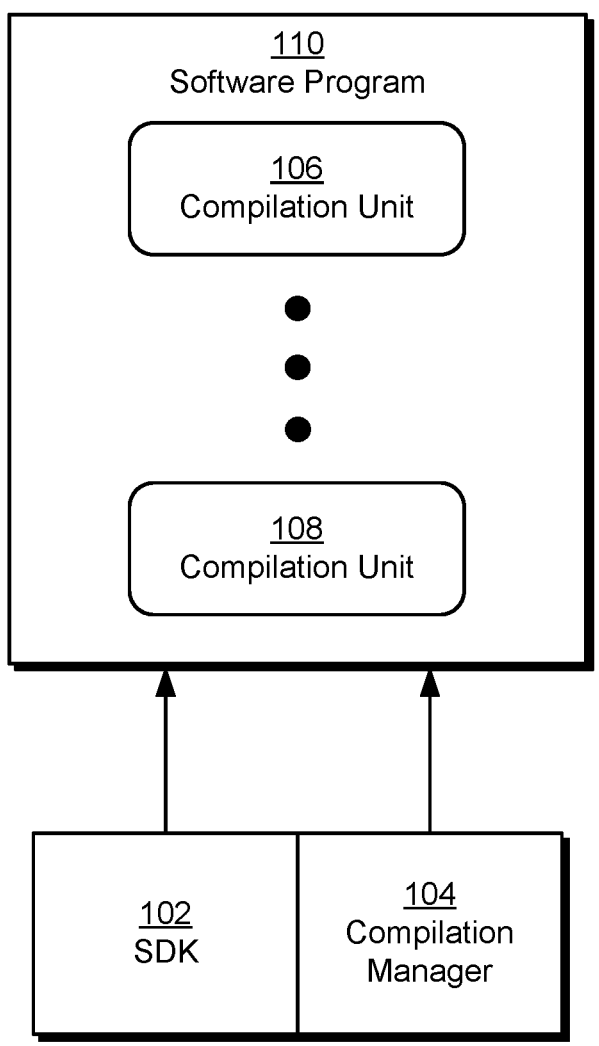
FIG. 1 shows a schematic of a system in accordance with an embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The disclosed embodiments provide a method and system for facilitating the development and compilation of a software program. During development of the software program, a number of compilation units containing source code for the software program may be created using a programming language. The compilation units may then be compiled into an executable form to enable the execution of the software program and/or used to generate compiler diagnostics.

More specifically, the disclosed embodiments provide a method and system for facilitating the compilation of the software program, where different compilation units are compiled and/or should be compiled under different versions of the programming language. For example, different compilation units of the software program may be compiled using different versions of the programming language to enable the use of features from a newer version of the programming language without requiring the removal of all incompatibilities with the newer version from the software program's source code. In addition, such compilation may be performed without obtaining manual user input associated with specifying a specific version of the programming language to be used in compiling each compilation unit.

First, a version order and/or version range associated with the programming language may be obtained. The version order may correspond to an ascending order, a descending order, and/or a user-specified order of versions of the programming language, while the version range may include a minimum version number and maximum version number with which the compilation units may be compiled. Next, for each of the compilation units, the version order and/or version range may be used to select a version of the programming language that is compatible with the compilation unit. The compilation unit may then be compiled under the selected version of the programming language.

In particular, the version may be selected by attempting to compile the compilation unit using a first version number in the version order. If the compilation unit does not compile successfully with the first version number, the selection process may proceed by attempting to compile the compilation unit using a second version number following the first version number in the version order. The second version number may then be selected if the compilation unit compiles successfully with the second version number. For example, individual compilation units may be matched with compatible versions of the programming language during compilation, or compatibility of the software program with versions of the programming language may be assessed on a per-package or per-module basis. Consequently, the disclosed embodiments may facilitate the migration of the entire software program to newer versions of the programming language by enabling the use of features from a newer version of the programming language without requiring the migration of the entire software program to the newer version.

FIG. 1 shows a schematic of a system in accordance with an embodiment. As shown in FIG. 1, a software development kit (SDK) 102 and a compilation manager 104 may be used to manage the development and compilation of a software program 110. For example, SDK 102 and/or compilation manager 104 may form a part of the Java (Java™ is a registered trademark of Oracle America, Inc.) Development Kit (JDK).

Software program 110 may correspond to a standalone application, operating system, enterprise application, database, library, device driver, and/or other type of executable code. In addition, software program 110 may be executed in a variety of environments. For example, software program 110 may be executed on a single desktop computer or workstation, or software program 110 may be distributed across multiple servers within a data center. Along the same lines, software program 110 may be executed sequentially or in parallel on one or more processors and/or processor cores.

During the development of software program 110, a set of compilation units 106-108 may be created using SDK 102. Compilation units 106-108 may include source code in a programming language supported by SDK 102. For example, compilation units 106-108 for a Java program may correspond to source files with ".java" extensions that contain Java classes, interfaces, enumerations, and/or annotation types.

After development of software program 110 is complete, compilation manager 104 may compile software program 110 by converting compilation units 106-108 into an executable format. For example, compilation manager 104 may be associated with a build system and/or integrated development environment (IDE) that manages and/or automates the compilation, linking, testing, debugging, and/or deployment of software program 110.

Compilation manager 104 may also include functionality to compile software program 110 using a version of the programming language specified by a user. For example, a developer of software program 110 may provide an invocation parameter specifying a numeric version (e.g., 1.4, 2.6, 2.0, etc.) of the programming language to be used in compiling software program 110 during invocation of compilation manager 104 from a command line. Alternatively, the developer may specify the version of the programming language to be used with each compilation unit 106-108 within a comment at the top of the compilation unit. Compilation manager 104 may then obtain the specified version(s) from the compilation unit and/or command line for use in compiling compilation units 106-108.

Such version-based compilation of software program 110 may thus provide flexibility in the adoption and/or use of different versions of the programming language by software program 110. For example, software program 110 may continue to be developed and/or compiled under an older version of the programming language as long as software program 110 does not utilize features included in newer versions of the programming language.

However, the adoption of a newer version of the programming language may be limited and/or delayed by the overhead associated with migrating the entirety of software program 110 from an older version of the programming language to the newer version at once. For example, a newly released 2.0 version of the programming language may include a new feature that a developer of software program 110 would like to use. The developer may continue to compile software program 110 with an older 1.6 version of the programming language while software program 110 is modified to include the new feature and/or remove incompatibilities with the 2.0 version of the programming language. As a result, the developer may not be able to use the new feature until software program 110 is fully updated to be compatible with the 2.0 version.

Conversely, the developer may use the new feature in software program 110 without migrating the entirety of software program 110 from the older version to the newer version by selectively compiling compilation units 106-108 that include the new feature with the newer version and compiling the remaining compilation units with the older version. In turn, the developer may be required to manually identify and/or specify the version of the programming language to be used with individual compilation units 106-108, which may complicate the build process for software program 110 and/or the developer's maintenance of software program 110.

To facilitate the migration of software program 110 from older versions of the programming language to newer versions of the programming language, compilation manager 104 may adaptively select versions of the programming language for use in compiling individual compilation units 106-108. As discussed in further detail below with respect to FIG. 2, compilation manager 104 may obtain a version order and/or a version range associated with the programming language. Then, for each compilation unit, compilation manager 104 may use the version order and/or version range to select a version of the programming language that is compatible with the compilation unit. Finally, compilation manager 104 may compile the compilation unit with the selected version. Compilation manager 104 may thus facilitate the migration of software program 110 from older versions of the programming language to newer versions of the programming language by ensuring that software program 110 compiles successfully under one or more versions of the programming language whenever possible.

Figure 2:
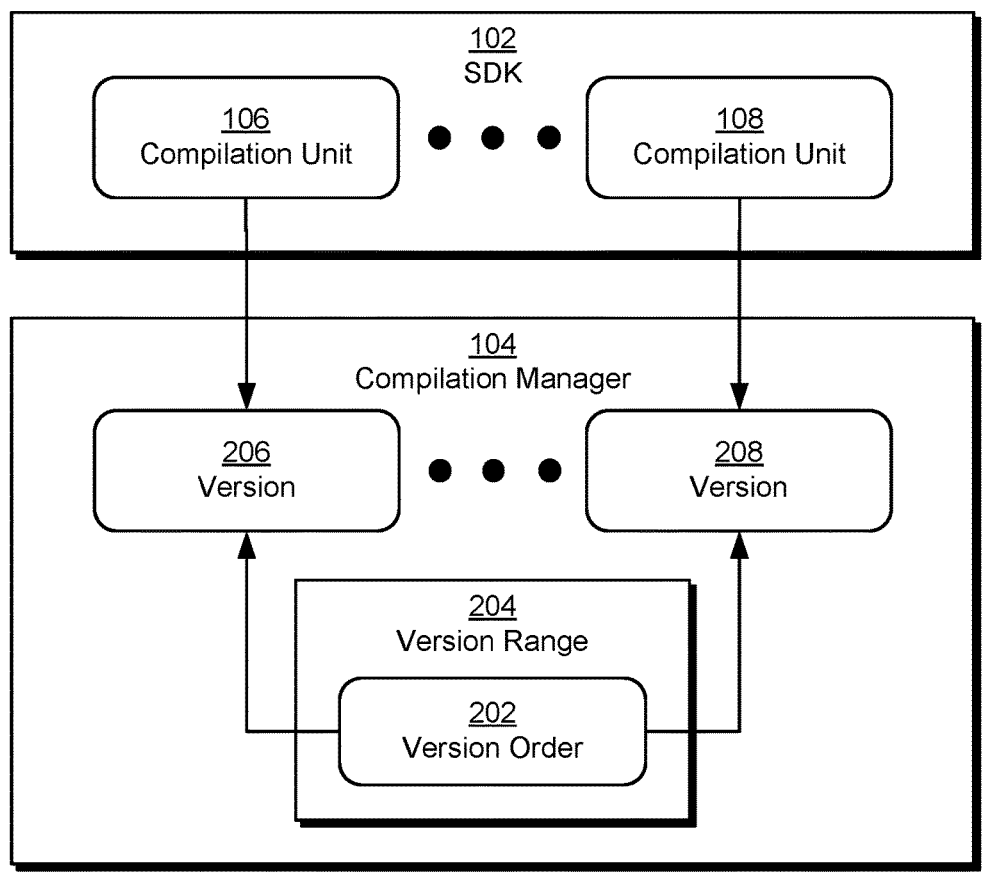
FIG. 2 shows the compilation of a set of compilation units in accordance with an embodiment.

FIG. 2 shows the compilation of a set of compilation units 106-108 in accordance with an embodiment. As mentioned above, compilation units 106-108 may be created using a programming language supported by SDK 102 during the development of a software program, such as software program 110 of FIG. 1. Once the software program is ready to be compiled, compilation manager 104 may reduce the complexity associated with compiling compilation units 106-108 and/or migrating the software program from one version of the programming language to another by selecting a version 206-208 of the programming language that is compatible with each compilation unit 106-108. Compilation manager 104 may then use the selected version to compile the compilation unit.

First, compilation manager 104 may obtain a version order 202 and/or version range 204 associated with the programming language. For example, compilation manager 104 may obtain version order 202 and version range 204 from invocation parameters provided by a developer of the software program to initiate compilation of the software program. Alternatively, if version order 202 and/or version range 204 are not specified by a user, compilation manager 104 may use default values for version order 202 and/or version range 204 to compile the software program.

In one or more embodiments, version order 202 corresponds to an order of numeric versions of the programming language to be used in selecting versions 206-208. For example, version order 202 may be specified by a user as an ascending order, in which version numbers in the order increase (e.g., 8.0, 8.1, 9.0), a descending order (e.g., 10.0, 9.8, 9.4), in which version numbers in the order decrease, and/or an order that is neither ascending nor descending (e.g., 5.5, 3.0, 7.6). Similarly, version range 204 may represent a range of numeric versions with which compilation units 106-108 may be compiled. As a result, version range 204 may include a minimum version number and a maximum version number.

Compilation manager 104 may then use version order 202 and/or version range 204 to selection a version 206-208 that is compatible with each compilation unit 106-108. For example, a developer may specify version order 202 as an ascending order and version range 204 with a minimum version number of 2.0 and a maximum version number of 3.0. Compilation manager 104 may thus compile compilation units 106-108 with versions 206-208 between 2.0 and 3.0 and evaluate the version numbers for use in compiling compilation units 106-108 in ascending order (e.g., 2.0, 2.2, 2.5, 3.0).

More specifically, compilation manager 104 may select each version 206-208 by attempting to compile the corresponding compilation unit 106-108 using a first version number in version order 202. If the compilation units compiles successfully with the first version number, compilation manager 104 may select the first version number for use in compiling the compilation unit. If the compilation unit does not compile successfully with the first version number, compilation manager 104 may attempt to compile the compilation unit using a second version number following the first version number in the version order. Compilation manager 104 may then select the second version number for use in compiling the compilation unit if the compilation unit compiles successfully with the second version number.

Compilation manager 104 may thus select each version 206-208 as the first version from a set of versions ordered by desirability that is compatible with the corresponding compilation unit 106-108. In other words, compilation manager 104 may use version order 202 and/or version range 204 to select the most desirable compatible version 206-208 for each compilation unit 106-108 in the software program.

For example, compilation manager 104 may use version order 202 and version range 204 to create a descending order of two versions to be evaluated for use in compiling compilation units 106-108: 8.0 and 7.0. Next, compilation manager 104 may attempt to compile each compilation unit using the 8.0 version of the programming language. If the compilation unit successfully compiles with the 8.0 version, compilation manager 104 may select 8.0 as the version number for the compilation unit. Conversely, if the compilation unit fails to compile with the 8.0 version, compilation manager 104 may attempt to compile the compilation unit using the 7.0 version of the programming language. Compilation manager 104 may then select 7.0 as the version to be used in compiling the compilation unit if the compilation unit successfully compiles with the 7.0 version or return a compilation error if the compilation unit also fails to compile under the 7.0 version.

Compilation manager 104 may further select a version for use in compiling a compilation unit based on the compatibility of the version with other compilation units (e.g., compilation units 106-108) in the software program. That is, compilation manager 104 may select a given version to be used in compiling the compilation unit if the compilation unit compiles successfully with the version, and if other compilation units in the same package, module, and/or code base for the software program compile successfully with the version.

For example, compilation manager 104 may use version order 202 and version range 204 to create an ascending order of three version numbers to be evaluated for use in compiling compilation units 106-108: 1.4, 1.5, and 1.6. To select a version that is compatible with the entire software program (e.g., during migration of the software program from an older version to a newer version), compilation manager 104 may begin by attempting to compile all compilation units 106-108 of the software program with the 1.4 version of the programming language. If the software program successfully compiles under the 1.4 version, compilation manager 104 may select the 1.4 version for use in compiling the software program. If the software program does not compile under the 1.4 version but compiles successfully under the 1.5 version, compilation manager 104 may select the 1.5 for each version 206-208. If the software program does not compile under the 1.5 version but compiles successfully under the 1.6 version, compilation manager 104 may select 1.6 for each version 206-208. Finally, if one or more compilation units 106-108 fail to compile with the 1.6 version, compilation manager 104 may generate a compilation error.

In other words, the ascending order may be used to determine the lowest numeric version of the programming language that may be used to compile each compilation unit 106-108 in the software program, while the descending order may be used to determine the highest compatible version 206-208 for each compilation unit 106-108. For example, the ascending order may be used to track the incremental migration (e.g., on a per-compilation-unit basis) of code bases from lower to higher versions of the programming language. The ascending order may also allow select compilation units 106-108 to use features associated with newer versions of the programming language while compiling the remainder of the software program under a lower version of the programming language.

Conversely, the descending order may be used to compile most compilation units 106-108 under the highest version of the programming language while allowing compilation units that are not compatible with the highest version to be compiled under lower versions of the programming language. In turn, the descending order may enable compilation of the software program when a new version of the programming language is incompatible with some compilation units 106. Furthermore, the selection of versions 206-208 based on compatibility with groups of compilation units (e.g., packages, modules, code bases) may provided added configurability and/or flexibility during the compilation of the software program and/or use of new language features in the software program.

Once versions 206-208 are selected, compilation manager 104 may compile compilation units 106-108 under the corresponding versions 206-208. To compile each compilation unit 106-108, compilation manager 104 may use the syntax and/or features associated with the corresponding version 206-208 of the programming language to convert the compilation unit 106-108 into an executable form. Moreover, compilation manager 104 may configure the executable form to use (e.g., link to) a library that is compatible with the version number. For example, if compilation units 106-108 in the software program are compiled with a combination of the 6.0 and 7.0 versions of the programming language, compilation manager 104 may link the compilation units compiled under the 6.0 version to libraries for the 6.0 version and compilation units compiled under the 7.0 version to libraries for the 7.0 version.

By automatically selecting versions 206-208 that are compatible with compilation units 106-108, compilation manager 104 may speed up the use of new programming language features in the software program while reducing overhead associated with migrating, compiling, and/or maintaining the software program. Furthermore, compilation manager 104 may adapt the selection of versions 206-208 based on version order 202 and/or version range 204, thus enabling the use of different compilation policies in compiling the software program. Finally, compilation manager 104 may ensure that dependencies associated with the selected versions 206-208 are satisfied by configuring the compiled forms of compilation units 106-108 to use libraries that are compatible with versions 206-208.

Figure 3:
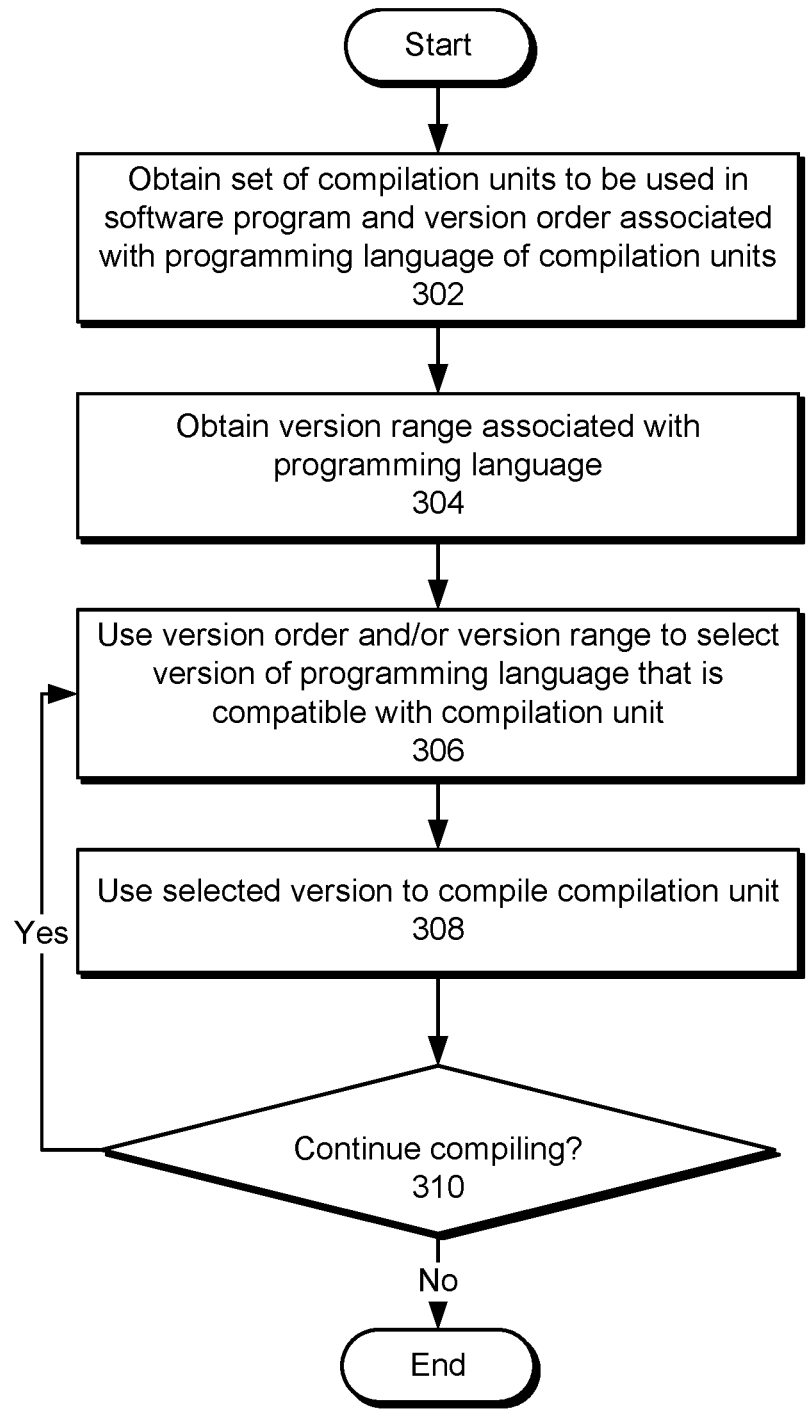
FIG. 3 shows a flowchart illustrating the process of facilitating the development and execution of a software program in accordance with an embodiment.

FIG. 3 shows a flowchart illustrating the process of facilitating the development and execution of a software program in accordance with an embodiment. In one or more embodiments, one or more of the steps may be omitted, repeated, and/or performed in a different order. Accordingly, the specific arrangement of steps shown in FIG. 3 should not be construed as limiting the scope of the embodiments.

First, a set of compilation units to be used in the software program and a version order associated with a programming language of the compilation units is obtained (operation 302). The version order may be an ascending order, a descending order, and/or a user-specified order. A version range associated with the programming language is also obtained (operation 304). The version range may include a minimum version number and a maximum version number.

Next, for a compilation unit, the version order and/or version range are used to select a version of the programming language that is compatible with the compilation unit (operation 306), and the selected version is used to compile the compilation unit (operation 308). For example, the version order and/or version range may be used to generate a numeric order of versions to be evaluated for use in compiling the compilation units. The numeric order may then be followed in the selection of the version number for the compilation unit.

As described above, the version may be selected by attempting to compile the compilation unit using a first version number in the version order. If the compilation unit compiles successfully with the first version number, the first version number is selected for use in compiling the compilation unit. If the compilation unit does not compile successfully with the first version number, the selection process may continue by attempting to compile the compilation unit using a second (e.g., higher) version number following the first version number in the version order. The second version number may be used to compile the compilation unit if the compilation unit compiles successfully with the second version number, and/or if other compilation units in the set of compilation units (e.g., in the same package, module, and/or code base for the software program) compile successfully with the second version number. For example, if the software program is being migrated to a newer version of the programming language on a per-compilation-unit basis, the version may be selected based on the compatibility of the version with just the compilation unit. On the other hand, if the software program is being migrated to the newer version on a per-package basis, the version may be selected based on the compatibility of the version with both the compilation unit and other compilation units in the same package as the compilation unit.

Moreover, if the compilation unit does not successfully compile under any version within the version range, a compilation error may be generated. In other words, a user (e.g., developer) may not be notified of compilation errors for the compilation unit and/or software program unless the compilation unit fails to meet one or more restrictions associated with compilation of the software program. For example, if compilation of the software program is performed on a per-compilation-unit basis, a compilation error may be generated only if the compilation unit fails to compile under all possible versions within the version range. Conversely, if compilation of the software program is performed on a per-module basis, a compilation error may be generated if no version within the version range can be used to successfully compile all compilation units in the module to which the compilation unit belongs.

Compilation of the software program may continue (operation 310) based on the successful compilation of the compilation unit and/or other compilation units in the software program. For example, the software program may continue to be compiled if the compilation unit compiles successfully and if other compilation units in the software program have not yet been compiled. If compilation of the software program is to continue, the version order and/or version range are used to select a version for a new compilation unit (operation 306), and the selected version is used to compile the compilation unit (operation 308). Selection of version numbers and compilation of compilation units using the selected version numbers may thus proceed until all compilation units to be used in the software program are compiled and/or a compilation unit fails to meet a restriction associated with compilation of the software program.

Figure 4:
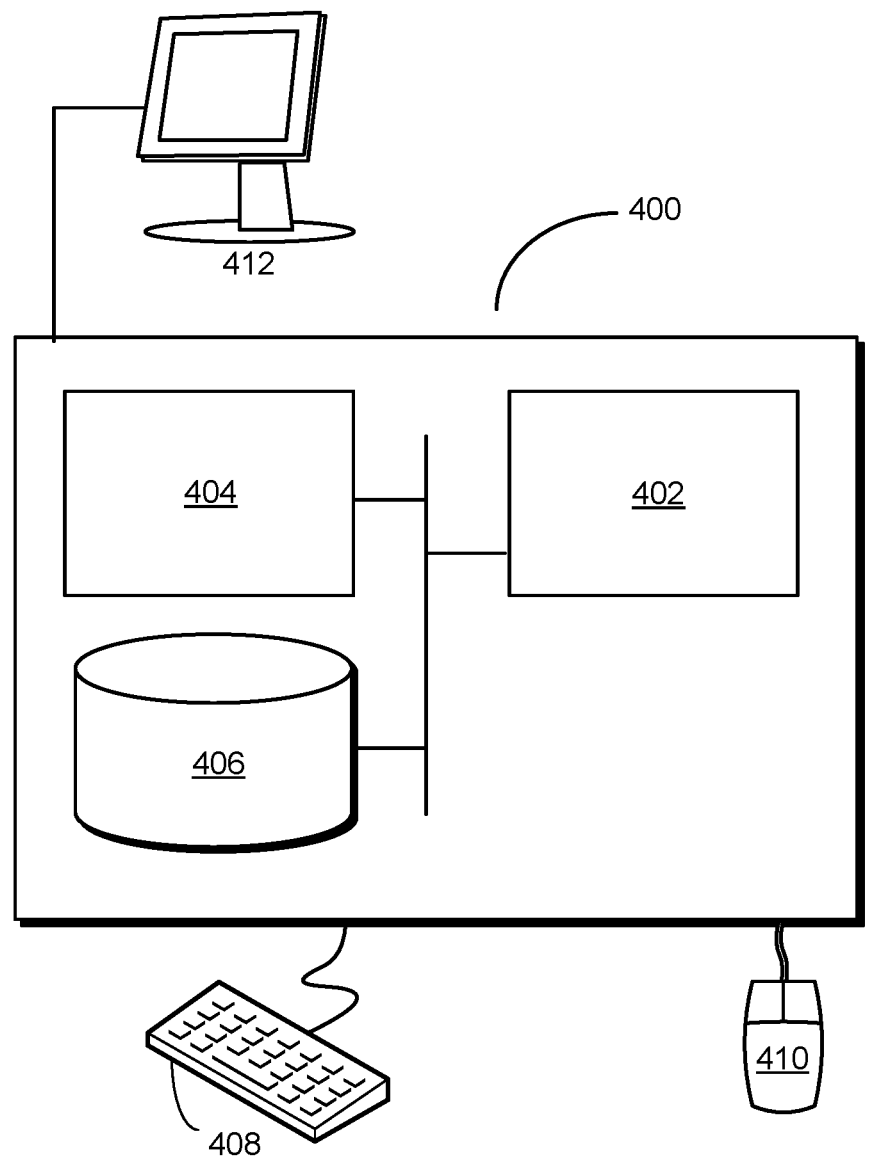
FIG. 4 shows a computer system in accordance with an embodiment.

FIG. 4 shows a computer system 400 in accordance with an embodiment. Computer system 400 includes a processor 402, memory 404, storage 406, and/or other components found in electronic computing devices. Processor 402 may support parallel processing and/or multi-threaded operation with other processors in computer system 400. Computer system 400 may also include input/output (I/O) devices such as a keyboard 408, a mouse 410, and a display 412.

Computer system 400 may include functionality to execute various components of the present embodiments. In particular, computer system 400 may include an operating system (not shown) that coordinates the use of hardware and software resources on computer system 400, as well as one or more applications that perform specialized tasks for the user. To perform tasks for the user, applications may obtain the use of hardware resources on computer system 400 from the operating system, as well as interact with the user through a hardware and/or software framework provided by the operating system.

In one or more embodiments, computer system 400 provides a system for facilitating the development and compilation of a software program. The system may include an SDK and a compilation manager. The SDK may enable the creation of a set of compilation units to be used in the software program using a programming language. Next, the compilation manager may obtain a version order and/or version range associated with the programming language. Then, for each compilation unit from the set of compilation units, the compilation manager may use the version order and/or version range to select a version of the programming language that is compatible with the compilation unit and use the selected version to compile the compilation unit.

In addition, one or more components of computer system 400 may be remotely located and connected to the other components over a network. Portions of the present embodiments (e.g., SDK, compilation manager, etc.) may also be located on different nodes of a distributed system that implements the embodiments. For example, the present embodiments may be implemented using a cloud computing system that remotely manages the development, compilation, and execution of software programs.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method, comprising:
at a computer system, obtaining:
a set of source code modules to be used in a software program;
a numeric range of versions for a programming language platform with which a compiler may compile, wherein the numeric range of versions may comprise supplemental alphanumeric characters, and wherein a version of the programming language platform outside of the numeric range of versions cannot be used and compiled by the compiler; and
ordering a numeric order between one or more older versions of the programming language platform and one or more newer versions of the programming language platform, wherein one or more versions of the programming language platform are to be used while compiling the source code modules; and
for each source code module from the set of source code modules:
selecting a first version of the programming language platform from a set of numeric versions of the programming language platform by using the numeric order with the numeric range of versions, wherein the selected first version of the programming language platform is compatible with the source code module; and
compiling the source code module with the selected first version of the programming language platform.

2. The method of claim 1, further comprising linking the set of source code modules to libraries associated with each version of the programming language platform, wherein source code modules that are compiled using different versions of the programming language platform are linked to different libraries associated with the different versions of the programming language platform.

3. The method of claim 1, wherein the numeric order comprises at least one of an ascending order, a descending order, and a user-specified order.

4. The method of claim 1, wherein a second version of the programming language platform is selected if the source code module fails to compile the first version of the programming language platform and compiles successfully with the second version of the programming language platform.

5. The method of claim 4, wherein the second version of the programming language platform is selected only if other source code modules in the set of source code modules also compile successfully with the second version of the programming language platform.

6. The method of claim 1, wherein the set of source code modules corresponds to at least one of a package, and a code base for the software program.

7. The method of claim 5, wherein:
a first source code module of the set of source code modules is compiled with the first version of the programming language platform in the numeric order and a second source code module of the set of source code modules is compiled with the second version of the programming language platform in the numeric order; and the first source code module is linked to a first library for the first version of the programming language platform in the numeric order and the second source code module is linked to a second library for the second version of the programming language platform in the numeric order.

8. The method of claim 1, wherein the selecting the first version of the programming language platform that is compatible with the source code module involves:

attempting to compile the source code module using the first version of the programming language platform in the numeric order;

responsive to the source code module compiling successfully with the first version of the programming language platform, selecting the first version of the programming language platform; and responsive to the source code module not compiling successfully with the first version of the programming language platform, attempting to compile the source code module using a second version of the programming language platform following the first version of the programming language in the numeric order.

9. A system, comprising:
a processor;
a memory;
a software development kit (SDK) configured to facilitate creation of a set of source code modules to be used in a software program; and
a compilation manager that:
obtains a numeric order between one or more older versions of a programming language platform and one or more newer versions of the programming language platform, wherein one or more versions of the programming language platform are to be used while compiling the source code modules; and obtains a numeric range of versions for a programming language platform with which the compilation manager may compile, wherein the numeric range of versions may comprise supplemental alphanumeric characters, and wherein a version of the programming language platform outside of the numeric range of versions cannot be used and compiled by the compilation manager; and for each source code module from the set of source code modules,
selects a first version of the programming language platform from a set of numeric versions of the programming language platform by using the numeric order with the numeric range of versions, wherein the selected first version of the programming language platform is compatible with the source code module, and
compiles the source code module with the selected first version of the programming language platform.

10. The system of claim 9, wherein the compilation manager additionally links the set of source code modules to libraries associated with each version of the programming language platform, wherein source code modules that are compiled using different versions of the programming language platform are linked to different libraries associated with the different versions of the programming language platform.

11. The system of claim 9, wherein a second version of the programming language platform is selected if the source code module compiles successfully with the second version of the programming language platform.

12. The system of claim 11, wherein the second version of the programming language platform is selected only if other source code modules in the set of source code modules also compile successfully with the second version of the programming language platform.

13. The system of claim 9, wherein while selecting the first version of the programming language platform that is compatible with the source code module, the compilation manager:

attempts to compile the source code module using the first version of the programming language platform in the numeric order;

responsive to the source code module compiling successfully with the first version of the programming language platform, selects the first version of the programming language platform; and responsive to the source code module not compiling successfully with the first version of the programming language platform, attempts to compile the source code module using a second version of the programming language platform following the first version of the programming language platform in the numeric order.

14. One or more non-transitory computer-readable storage media storing instructions that when executed by a computer cause the computer to perform a method comprising:

obtaining a set of source code modules to be used in a software program and a numeric order between older versions of a programming language platform and newer versions of the programming language platform, wherein one or more versions of the programming language platform are to be used while compiling the source code modules;

obtaining a numeric range of versions for a programming language platform with which a compiler may compile, wherein the numeric range of versions may comprise supplemental alphanumeric characters, and wherein a version outside of the numeric range of versions cannot be used and compiled by the compiler; and for each source code module from the set of source code modules:
selecting a first version of the programming language platform from a set of numeric versions of the programming language platform by using the numeric order with the numeric range of versions, wherein the selected version of the programming language platform is compatible with the source code module; and
compiling the source code module with the selected first version of the programming language platform.

15. The one or more non-transitory computer-readable storage media of claim 14, further comprising linking the set of source code modules to libraries associated with each version of the programming language platform, wherein source code modules that are compiled using different versions of the programming language platform are linked to different libraries associated with the different versions of the programming language platform.

16. The one or more non-transitory computer-readable storage media of claim 14, wherein using the numeric order to select the first version of the programming language platform comprises:

attempting to compile the source code module using the first version of the programming language platform in the numeric order;

responsive to the source code module compiling successfully with the first version of the programming language platform, selecting the first version of the programming language platform; and responsive to the source code module not compiling successfully with the first version of the programming language platform, attempting to compile the source code module using a second version of the programming language platform following the first version of the programming language platform in the numeric order.

* * * * *

UNITED STATES PATENT AND TRADEMARK OFFICE
CERTIFICATE OF CORRECTION

PATENT NO. : 10,073,684 B2
APPLICATION NO. : 15/223759
DATED : September 11, 2018
INVENTOR(S) : Brian Goetz et al.

Page 1 of 1

It is certified that error appears in the above-identified patent and that said Letters Patent is hereby corrected as shown below:

On the Title Page

In the "Other Publications" section on page 3, please delete the words "joy.fm" and please insert the words --jot.fm--.

In the Claims

In Claim 1 (at Column 10, Line 23), please delete the word "ordering".

Signed and Sealed this
Third Day of August, 2021

Drew Hirshfeld
*Performing the Functions and Duties of the*
*Under Secretary of Commerce for Intellectual Property and*
*Director of the United States Patent and Trademark Office*